(12) United States Patent
Kimura (10) Patent No.: US 12,019,936 B2
(45) Date of Patent: Jun. 25, 2024

(54) NON-TRANSITORY COMPUTER READABLE STORAGE MEDIUM, CONTROL METHOD, AND MOBILE TERMINAL

(71) Applicant: CANON KABUSHIKI KAISHA, Tokyo (JP)

(72) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/722,966

(22) Filed: Apr. 18, 2022

(65) Prior Publication Data

US 2022/0236936 A1   Jul. 28, 2022

Related U.S. Application Data

(63) Continuation of application No. 15/978,758, filed on May 14, 2018.

(30) Foreign Application Priority Data

May 19, 2017   (JP) ................ 2017-100156

(51) Int. Cl.
| | | |
|---|---|---|
| *G06F 3/12* | (2006.01) | |
| *H04W 8/00* | (2009.01) | |
| *H04W 48/08* | (2009.01) | |
| *H04W 88/06* | (2009.01) | |
| *H04W 84/12* | (2009.01) | |

(52) U.S. Cl.
CPC .......... *G06F 3/1292* (2013.01); *H04W 8/005* (2013.01); *H04W 48/08* (2013.01); *H04W 88/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0224707 A1* | 10/2006 | Kawai ................. | H04L 41/22 709/226 |
| 2007/0011312 A1* | 1/2007 | Nakamura ........... | H04W 24/00 709/224 |
| 2008/0019290 A1 | 1/2008 | Suzuki | |
| 2011/0216361 A1 | 9/2011 | Nakayama | |
| 2011/0317211 A1 | 12/2011 | Yamada | |
| 2012/0054338 A1 | 3/2012 | Ando | |
| 2012/0233688 A1* | 9/2012 | Tonouchi .............. | H04W 48/20 726/17 |
| 2013/0135674 A1* | 5/2013 | Hirabayashi ......... | G06F 3/1204 358/1.15 |
| 2013/0141756 A1* | 6/2013 | Miller .................. | G06F 3/1296 358/1.15 |

(Continued)

FOREIGN PATENT DOCUMENTS

| | | |
|---|---|---|
| CN | 103763450 A | 4/2014 |
| CN | 105282361 A | 1/2016 |

(Continued)

*Primary Examiner* — Ernest G Tacsik
(74) *Attorney, Agent, or Firm* — Canon U.S.A., Inc. I.P. Division (57) ABSTRACT

A mobile terminal displays a guide screen for causing a printing apparatus to participate in a wireless network in which the mobile terminal is participating. An SSID of an access point to which the mobile terminal is connected is displayed.

15 Claims, 6 Drawing Sheets

(56) References Cited

U.S. PATENT DOCUMENTS

| | | | |
|---|---|---|---|
| 2013/0331141 A1* | 12/2013 | Montemurro | H04W 48/18 |
| | | | 455/515 |
| 2014/0325402 A1* | 10/2014 | Jung | G06F 3/04883 |
| | | | 715/763 |
| 2015/0212763 A1 | 7/2015 | Sharpe | |
| 2015/0382136 A1* | 12/2015 | Mihira | H04W 76/14 |
| | | | 455/41.1 |
| 2016/0286592 A1* | 9/2016 | Suzuki | H04W 24/10 |
| 2016/0330628 A1 | 11/2016 | Kakutani | |
| 2016/0373270 A1* | 12/2016 | Yang | H04L 63/08 |
| 2016/0381722 A1 | 12/2016 | Konji | |
| 2017/0041977 A1 | 2/2017 | Yokoyama | |
| 2017/0094104 A1 | 3/2017 | Fujiwara | |
| 2017/0220311 A1* | 8/2017 | Oh | H04L 65/1083 |
| 2018/0324684 A1* | 11/2018 | Onohara | H04N 21/4363 |

FOREIGN PATENT DOCUMENTS

| | | |
|---|---|---|
| CN | 106165341 A | 11/2016 |
| EP | 2704410 A1 | 3/2014 |
| EP | 2961078 A1 | 12/2015 |
| JP | 2011120279 A | 6/2011 |
| JP | 2014197262 A | 10/2014 |
| JP | 2017074781 A | 4/2017 |
| WO | 2008023747 A1 | 2/2008 |
| WO | 2012091146 A1 | 7/2012 |
| WO | 2013118614 A1 | 8/2013 |

\* cited by examiner

# NON-TRANSITORY COMPUTER READABLE STORAGE MEDIUM, CONTROL METHOD, AND MOBILE TERMINAL

CROSS-REFERENCE TO RELATED APPLICATIONS

The present application is a continuation of U.S. patent application Ser. No. 15/978,758, filed on May 14, 2018, which claims priority from Japanese Patent Application No. 2017-100156 filed on May 19, 2017. These applications are hereby incorporated by reference herein in their entireties.

BACKGROUND

Field

The present disclosure relates to a non-transitory computer readable storage medium, a control method, and a mobile terminal.

Description of the Related Art

A mobile terminal including wireless LAN functionality can be connected to an access point to perform a search for a printing apparatus through the access point. The mobile terminal can then transmit a print job to the printing apparatus designated by a user from among the search results. The printing apparatus that receives the print job can perform a print process based on the received print job on a sheet. Japanese Patent Laid-Open No. 2014-11671 discloses a configuration in which a mobile terminal connects sequentially to a plurality of access points to perform a search for a printing apparatus through the plurality of access points.

A user can transmit a print job from a mobile terminal to the printing apparatus in front of the user. In this case, in order for the mobile terminal to search and find the printing apparatus, the printing apparatus may be required to participate in the wireless LAN network in which the mobile terminal is participating. However, the printing apparatus may not participate in the wireless LAN network in which the mobile terminal is participating, or the printing apparatus primarily may not connect to any access point. In this case, the printing apparatus cannot be found through the search performed by the mobile terminal.

SUMMARY

According to an aspect of the present disclosure, a non-transitory computer readable storage medium for storing a computer program for causing a computer of a mobile terminal to execute a control method, the control method includes an obtaining step of obtaining a Service Set Identifier (SSID) of an access point to which the mobile terminal is connected; and a screen displaying step of displaying, in accordance with receiving a screen display instruction for displaying a guide screen for causing a printing apparatus to participate in a wireless network in which the mobile terminal is participating, the guide screen, wherein the SSID obtained in the obtaining step is displayed in the guide screen.

Further features will become apparent from the following description of exemplary embodiments with reference to the attached drawings.

DESCRIPTION OF THE EMBODIMENTS

Exemplary embodiments for implementing the present disclosure will be described below with reference to drawings. It should be understood that the following embodiments are not intended to limit aspects of the present disclosure and that all of combinations of features according to the embodiments are not necessarily required for implementation of the aspects of the present disclosure.

Embodiments

Figure 1:
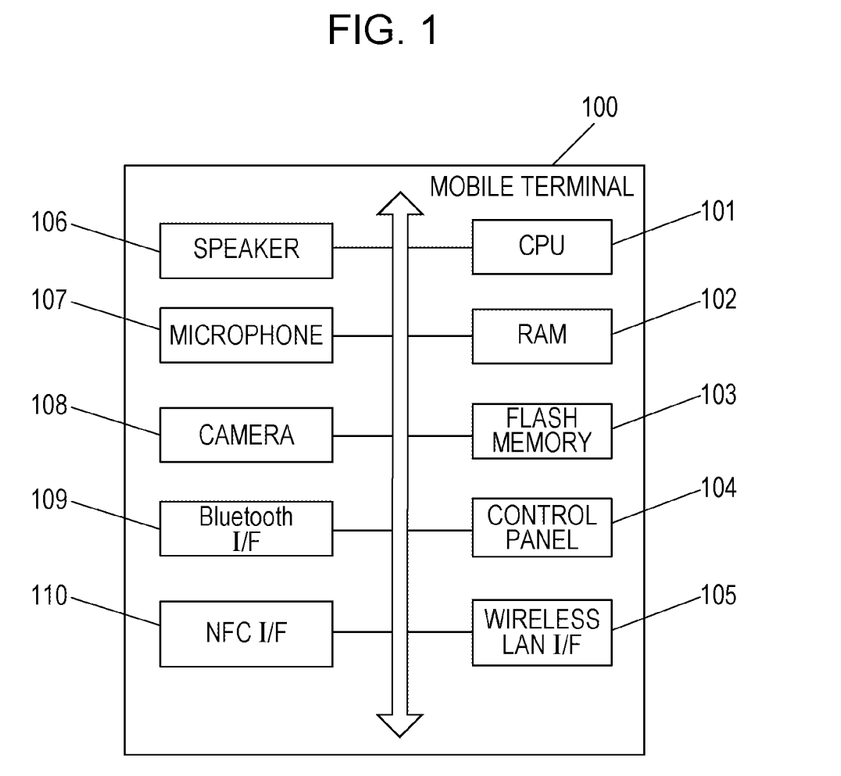
FIG. 1 illustrates a hardware configuration of a mobile terminal.

First, with reference to FIG. 1, a hardware configuration of a mobile terminal 100 will be described. The mobile terminal 100 according to an embodiment is assumed to be a smart phone. However, embodiments of the present disclosure are applicable to an apparatus including wireless LAN functionality and any other apparatuses such as a digital camera, a digital game machine, and a laptop personal computer (PC).

A CPU 101 is configured to read out a control program stored in a flash memory 103 and to execute various processes for controlling operations of the mobile terminal 100. A RAM 102 is usable as a temporary storage area such as a main memory and a work area for the CPU 101. The flash memory 103 can be a nonvolatile storage medium configured to store a control program for the mobile terminal 100 and various kinds of data such as images and electronic documents.

While the present embodiment is described with one CPU 101 in the mobile terminal 100 configured to execute processes illustrated in a flowchart described below, other configurations are also applicable. For example, a plurality of CPUs can cooperate with each other to execute processes illustrated in the below-described flowchart. Some processes in the below-described flowchart can be executed by a hardware circuit such as an ASIC.

A control panel 104 includes a touch panel function that detects a touch operation performed by a user and is configured to display screens. A user can input a touch operation through the control panel 104 to input a desired instruction to the mobile terminal 100. The mobile terminal 100 can include a hardware key (not illustrated) so that a user can use the hardware key to input an operating instruction to the mobile terminal 100.

A speaker 106 and a microphone 107 can be used by a user to make telephone calls. A camera 108 is configured to capture an image in response to an image-capture instruction from a user. The image captured by the camera 108 is stored in a predetermined area in the flash memory 103.

A Bluetooth® I/F 109 is configured to implement Bluetooth® wireless communication. An NFC I/F 110 is configured to implement near field radio communication (NFC). A wireless LAN I/F 105 is configured to implement IEEE 802.11a/b/g/n/ac wireless LAN communication. The wireless LAN I/F 105 can connect to an external access point to participate in a wireless LAN network including the access point.

Figure 2:
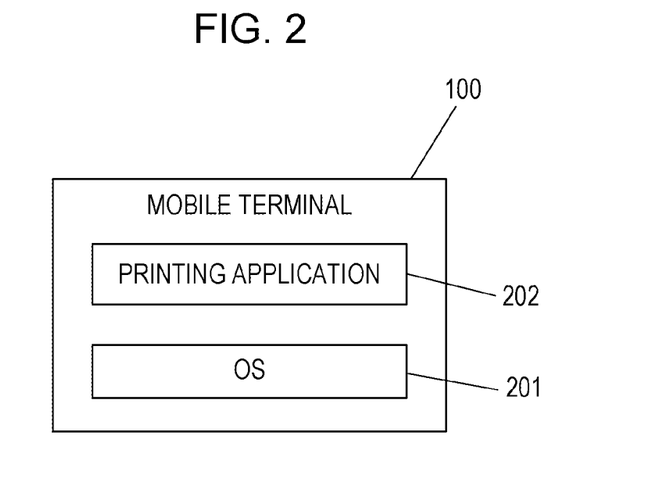
FIG. 2 illustrates a software configuration of the mobile terminal.

A software configuration of the mobile terminal 100 will be described with reference to FIG. 2. FIG. 2 is a functional block diagram implemented by a control program stored in the flash memory 103 and executed by the CPU 101.

An OS 201 is a software application configured to control operations performed by the mobile terminal 100. Various applications including a print application 202, which will be described below, can be installed in the mobile terminal 100. The OS 201 can control operations of the mobile terminal 100 in response to an instruction from an application or a user's operating instruction input through the control panel 104.

The print application 202 is configured to provide a print function to a user. The print application 202 can instruct the OS 201 to perform a search for a printing apparatus, generate a print job, and transmit the generated print job. The mobile terminal 100 also includes various applications in addition to the print application 202, but descriptions of these other applications is omitted.

User operating procedures and screens displayed on the mobile terminal 100 will be described with reference to FIGS. 3A to 3D and FIGS. 4A and 4B.

Figure 3A:
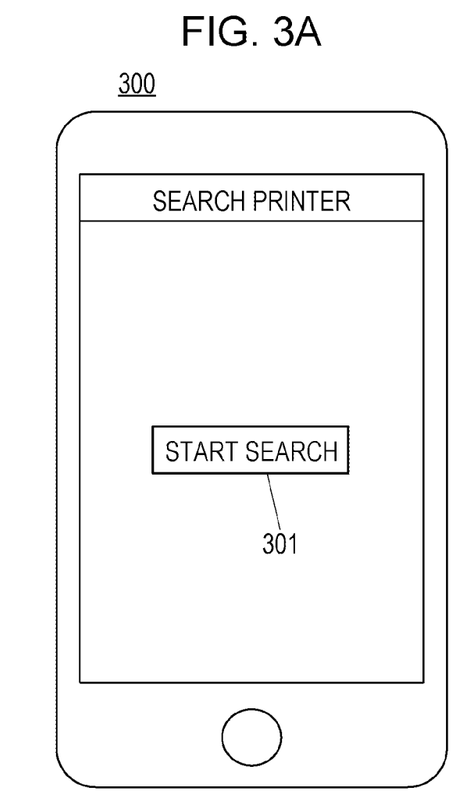
FIGS. 3A to 3D illustrate screens to be displayed on the mobile terminal.

FIG. 3A illustrates a search screen 300 displayed on the control panel 104 in response to an instruction from the print application 202. The search screen 300 is used to instruct start of a search for a printing apparatus. If a user selects (or touches the touch panel) a search start button 301, the mobile terminal 100 starts a search for a printing apparatus. The search for a printing apparatus can be implemented by transmission of a search packet from the wireless LAN I/F 105 through an access point to which the mobile terminal 100 is connected. When the search for a printing apparatus starts, the mobile terminal 100 displays an in-searching screen 310 in FIG. 3B.

Figure 3B:
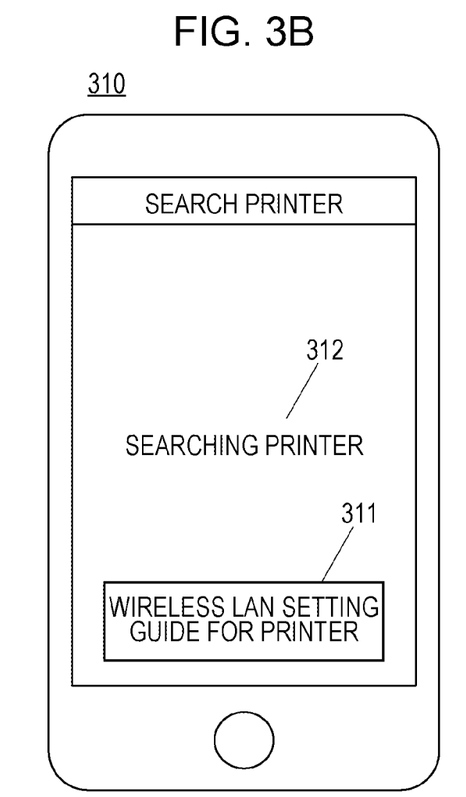
Figure 3C:
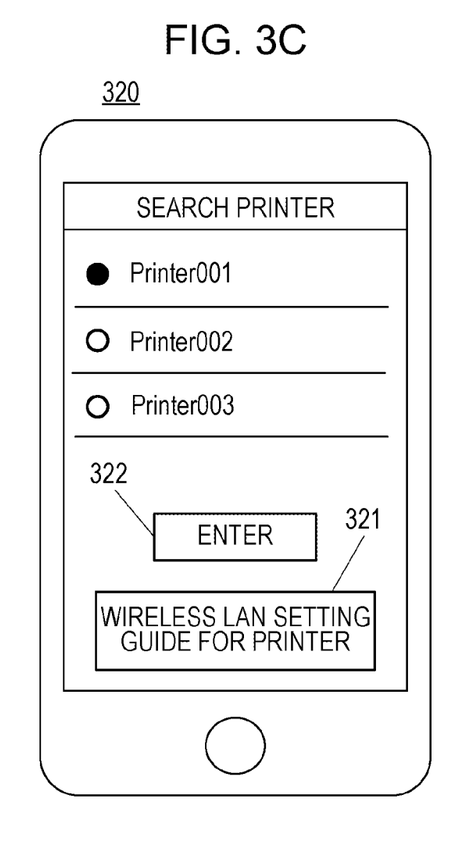

FIG. 3B illustrates the in-searching screen 310 displayed on the control panel 104 in response to an instruction from the print application 202. The in-searching screen 310 displays a message 312 indicating that a search for a printing apparatus is being executed. If a user selects a guide screen display button 311, the mobile terminal 100 ends the search for a printing apparatus and displays a guide screen 400 in FIG. 4A or an error screen 410 in FIG. 4B. The guide screen 400 and the error screen 410 will be described below. If a printing apparatus is found as a result of the search, the mobile terminal 100 displays a search result screen 320 as illustrated in FIG. 3C. If no printing apparatus is found as a result of the search, the mobile terminal 100 displays a search result screen 330 as illustrated in FIG. 3D.

The search result screen 320 in FIG. 3C is displayed on the control panel 104 in response to an instruction from the print application 202. The search result screen 320 displays a list of identification information (such as a model name or an IP address) of the printing apparatuses found as a result of the search. If a user selects a desired printing apparatus and selects an ENTER button 322, the print application 202 identifies the printing apparatus selected by the user as a destination of the print job. If the user selects a guide screen display button 321, the mobile terminal 100 displays the guide screen 400 in FIG. 4A or the error screen 410 in FIG. 4B. The guide screen 400 and the error screen 410 will be described below.

Figure 3D:
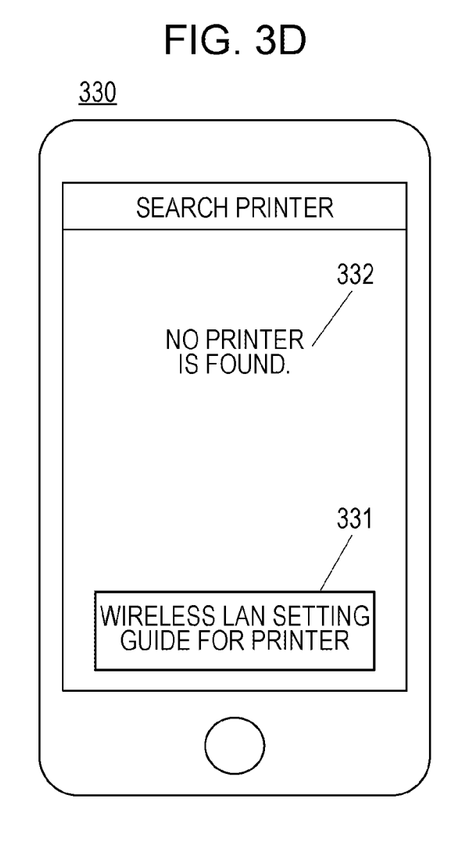

The search result screen 330 in FIG. 3D is displayed on the control panel 104 in response to an instruction from the print application 202. The search result screen 330 displays a message 332 indicating that no printing apparatus has been found. If the user selects a guide screen display button 331, the mobile terminal 100 displays the guide screen 400 in FIG. 4A or the error screen 410 in FIG. 4B. The guide screen 400 and the error screen 410 will be described below.

Figure 4A:
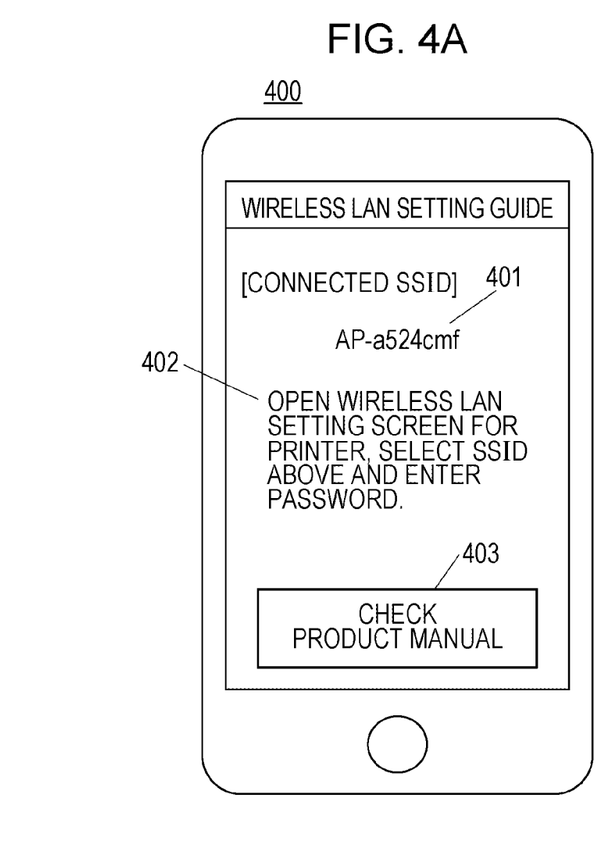
FIGS. 4A and 4B illustrate screens to be displayed on the mobile terminal.

The guide screen 400 in FIG. 4A is displayed on the control panel 104 in response to an instruction from the print application 202. The guide screen 400 is displayed if one of the guide screen display buttons 311, 321, and 331 is selected by a user when the mobile terminal 100 connects to the access point. If no desired printing apparatus has been found as a result of the search, there is a high possibility that the printing apparatus is not present within the wireless LAN network in which the mobile terminal 100 is participating. The guide screen 400 displays an SSID 401 of the access point to which the mobile terminal 100 connects and displays a message 402 prompting a user to connect the printing apparatus to the SSID 401. A user can check the guide screen 400 so that the desired printing apparatus can be caused to participate in the wireless LAN network in which the mobile terminal 100 is participating. The guide screen 400 displays a manual check button 403. If a user selects the manual check button 403, the mobile terminal 100 displays a manual that describes an operating procedure for defining a wireless LAN setting for the printing apparatus.

Figure 4B:
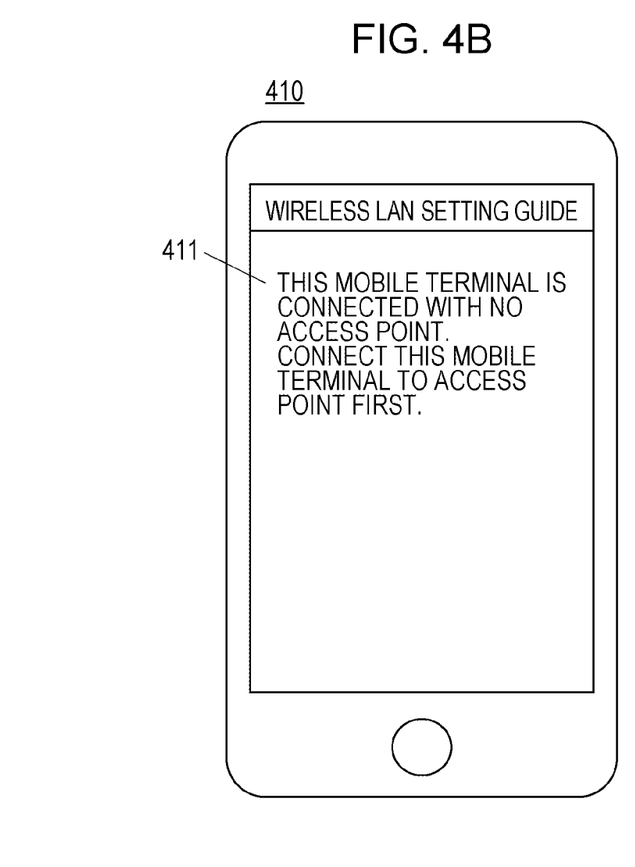

The error screen 410 in FIG. 4B is displayed on the control panel 104 in response to an instruction from the print application 202. The error screen 410 is displayed if one of the guide screen display buttons 311, 321, 331 is selected by a user when the mobile terminal 100 does not connect to the access point. The error screen 410 displays a message 411 prompting a user to connect the mobile terminal 100 to the access point.

Figure 5:
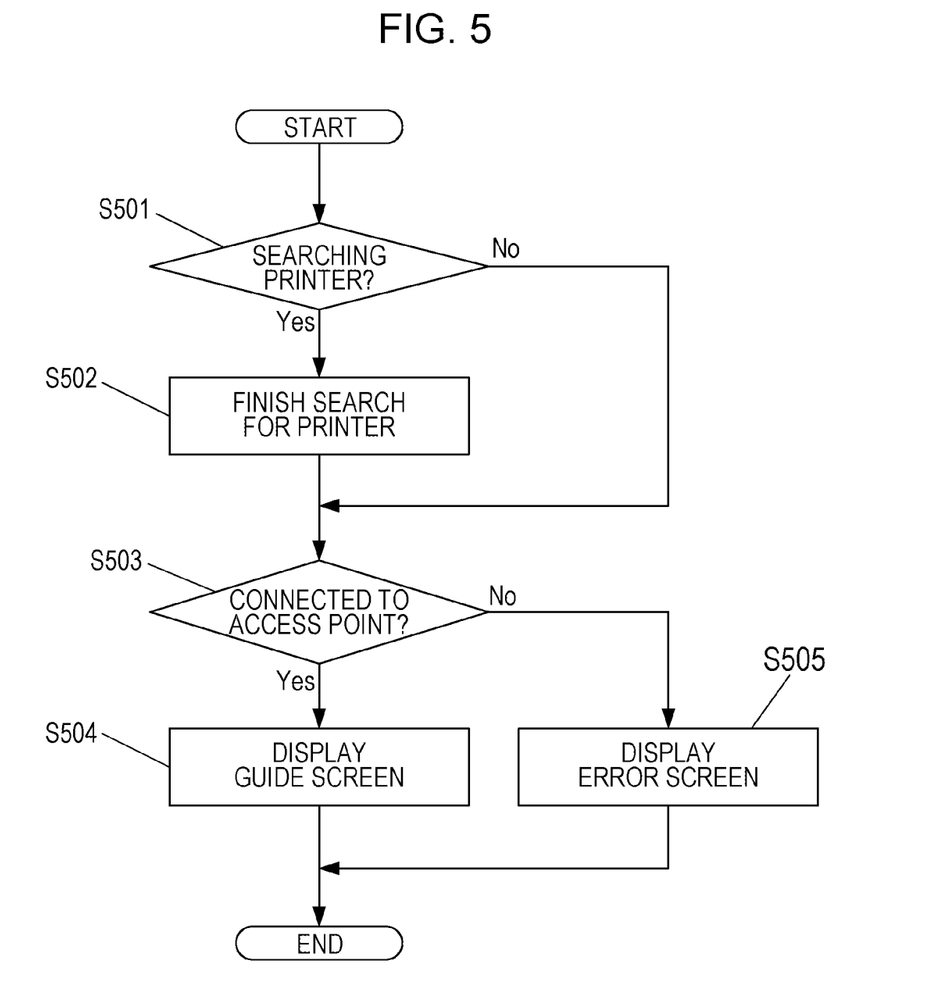
FIG. 5 is a flowchart illustrating processing to be executed by the mobile terminal.

Next, processing to be executed by the mobile terminal 100 will be described with reference to FIG. 5. Steps in the flowchart in FIG. 5 are implemented by a control program stored in the flash memory 103, extracted into the RAM 102, and executed by the CPU 101. The processing illustrated in the flowchart in FIG. 5 is executed when a user selects one of the guide screen display buttons 311, 321, and 331.

In step S501, the print application 202 determines whether a search for a printing apparatus is being performed. If the search for a printing apparatus is being performed, the processing moves to step S502. If the search for a printing apparatus is not being performed, the processing moves to step S503.

In step S502, the print application 202 ends the search for a printing apparatus.

In step S503, the print application 202 determines whether the mobile terminal 100 is in connection with the access point. The print application 202 inquires of the OS 201 whether the mobile terminal 100 is in connection with the access point. The print application 202 can check a reply to the inquiry from the OS 201 so that the processing in step S503 can be performed. If the mobile terminal 100 is in connection with the access point, the processing moves to step S504. If the mobile terminal 100 is not in connection with the access point, the processing moves to step S505.

In step S504, the print application 202 instructs the OS 201 to display the guide screen 400. Under control of the OS 201, the control panel 104 displays the guide screen 400. The print application 202 obtains from the OS 201 the SSID of the access point to which the mobile terminal 100 is connected. The guide screen 400 displays the SSID obtained from the OS 201. A user can check the guide screen 400 to facilitate determination on the access point to which the printing apparatus is to be connected so that a wireless LAN communication can be established between the mobile terminal 100 and the printing apparatus.

In step S505, the print application 202 instructs the OS 201 to display the error screen 410. Under control of the OS 201, the control panel 104 displays the error screen 410.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A method that is performed by executing an application of a mobile terminal, the method comprising:
   causing the mobile terminal to perform a search for a printing apparatus;
   causing the mobile terminal to display identification information of at least one printing apparatus found by the search;
   causing the mobile terminal to transmit print data to a printing apparatus of which identification information is selected from among the identification information of the at least one printing apparatus found by the search;
   causing the mobile terminal to obtain, from an Operating System of the mobile terminal, a Service Set Identifier of an access point to which the mobile terminal is connected; and
   causing the mobile terminal to display guidance information for a wireless communication between the mobile terminal and another printing apparatus which has not been found by the search, the guidance information including the obtained Service Set Identifier and information allowing a user to recognize that the Service Set Identifier is a Service Set Identifier of the access point to which the mobile terminal is connected.

2. The method according to claim 1, wherein an object for displaying the guidance information and the identification information of the at least one printing apparatus found by the search are displayed.

3. The method according to claim 2, wherein a screen including the object and the guidance information are displayed.

4. The method according to claim 2, further comprising causing the mobile terminal to display error information in a case where the mobile terminal is not connected to an access point when an operation on the object is received.

5. The method according to claim 1,
   wherein the guidance information is guidance information for recommending a user to set the Service Set Identifier in the another printing apparatus.

6. The method according to claim 1, further comprising causing the mobile terminal to display an object for displaying manual information regarding a wireless setting with the Service Set Identifier.

7. The method according to claim 1, further comprising causing the mobile terminal to transmit print data using the Service Set Identifier.

8. A non-transitory computer readable storage medium for storing an application that, when executed, causes a mobile terminal to:
   perform a search for a printing apparatus;
   display identification information of at least one printing apparatus found by the search;
   transmit print data to a printing apparatus of which identification information is selected from among the identification information of the at least one printing apparatus found by the search;
   obtain, from an Operating System of the mobile terminal, a Service Set Identifier (SSID) of an access point to which the mobile terminal is connected; and
   display guidance information for a wireless communication between the mobile terminal and another printing apparatus which has not been found by the search, the guidance information including the obtained Service Set Identifier and information allowing a user to recognize that the Service Set Identifier is a Service Set Identifier of the access point to which the mobile terminal is connected.

9. The non-transitory computer readable storage medium according to claim 8, wherein an object for displaying the guidance information and the identification information of the at least one printing apparatus found by the search are displayed.

10. The non-transitory computer readable storage medium according to claim 9, wherein a screen including the object and the guidance information are displayed.

11. The non-transitory computer readable storage medium according to claim 9, wherein the application that, when executed, further causes the mobile terminal to
    display error information in a case where the mobile terminal is not connected to an access point when an operation on the object is received.

12. The non-transitory computer readable storage medium according to claim 8,
    wherein the guidance information is guidance information for recommending a user to set the Service Set Identifier in the another printing apparatus.

13. The non-transitory computer readable storage medium according to claim 8, wherein the application that, when executed, further causes the mobile terminal to display an object for displaying manual information regarding a wireless setting with the Service Set Identifier.

14. The non-transitory computer readable storage medium according to claim 8, wherein the application that, when executed, further causes the mobile terminal to transmit print data using the Service Set Identifier.

15. An information processing apparatus that has an application, comprising:
- a controller that performs a search for a printing apparatus; and
- a display,
- wherein the display displays identification information of at least one printing apparatus found by the search,
- wherein the controller causes the information processing apparatus to transmit print data to a printing apparatus of which identification information is selected from among the identification information of the at least one printing apparatus found by the search,
- wherein the controller causes the information processing apparatus to obtain, from an Operating System of the mobile terminal, a Service Set Identifier of an access point to which the mobile terminal is connected, and
- wherein the display displays guidance information for a wireless communication between the mobile terminal and another printing apparatus which has not been found by the search, the guidance information including the obtained Service Set Identifier and information allowing a user to recognize that the Service Set Identifier is an Service Set Identifier of the access point to which the mobile terminal is connected.

* * * * *